United States Patent [19]

Lyngsgaard et al.

[11] 4,057,709
[45] Nov. 8, 1977

[54] PARTICLE DETECTOR

[76] Inventors: Joergen Lyngsgaard, 4755 Dover Road; Ariel Stiebel, 88 Marlborough, both of Bloomfield Hills, Mich. 48013

[21] Appl. No.: 702,843

[22] Filed: July 6, 1976

[51] Int. Cl.² .......................................... B65G 51/36
[52] U.S. Cl. ........................ 235/92 PK; 235/92 R; 235/98 R
[58] Field of Search .......... 235/92 PK, 92 PE, 92 V, 235/98 R, 98 B

[56] References Cited

U.S. PATENT DOCUMENTS

| | | | |
|---|---|---|---|
| 2,580,192 | 12/1951 | Potter | 235/92 PK |
| 2,961,158 | 11/1960 | Frederick | 235/92 PK |
| 3,558,004 | 1/1971 | Boyd et al. | 235/92 PK |
| 3,632,918 | 1/1972 | Anson et al. | 235/92 PK |
| 3,694,630 | 9/1972 | Dybel | 235/92PK |
| 3,760,166 | 9/1973 | Adams et al. | 235/92 PK |
| 3,881,353 | 5/1975 | Fathauer | 235/92 PK |

*Primary Examiner*—Joseph M. Thesz
*Attorney, Agent, or Firm*—Hauke & Patalidis

[57] ABSTRACT

A particle detector, such as for detecting the passage of seeds through a mechanical seeder, comprising an angled-over impact resounding tubular conduit disposed in the flow of particles such that each particle is caused to impact and be deflected by the wall of the angled-over conduit. An impact detecting transducer, such as a crystal, is attached to the exterior wall of the angled-over conduit at, or proximate to, the area of particle impact. The angled-over conduit is connected between a pair of inlet and outlet conduits made of substantially impact absorbing material. The transducer feeds into a utilization circuit permitting to simply detect whether particles are present or not in the conduit, or, in the alternative, capable of counting the number of particles passing through the conduit.

13 Claims, 2 Drawing Figures

FIG. 1
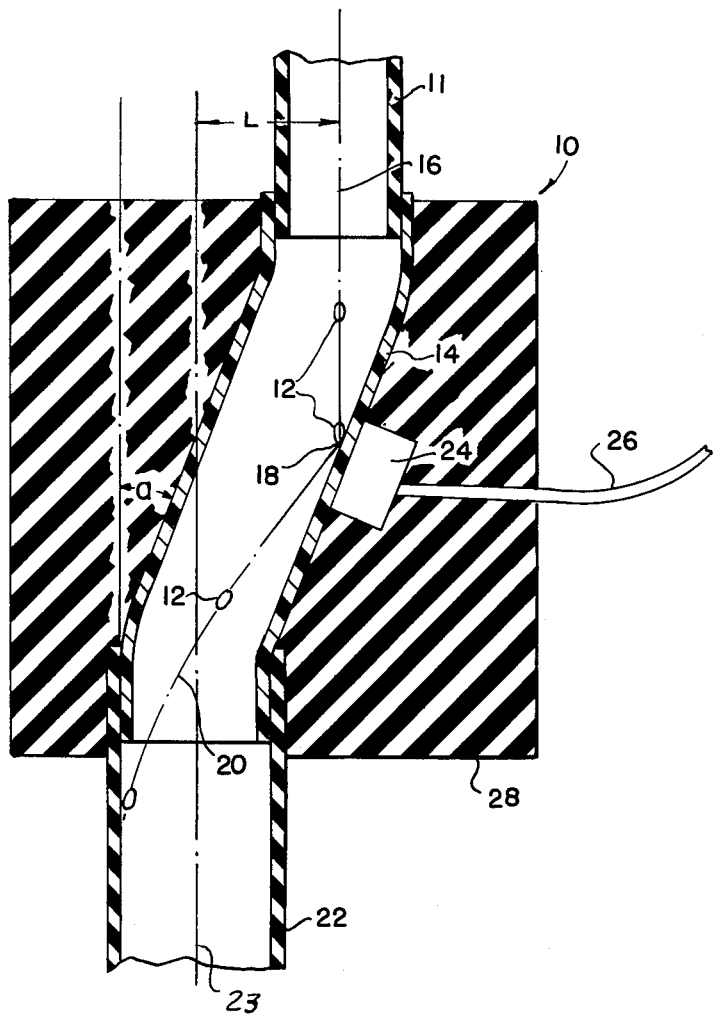
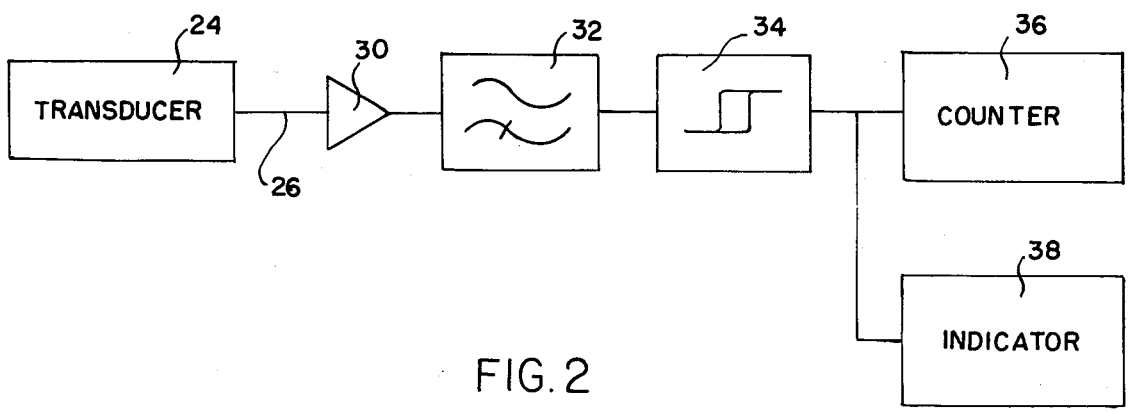
FIG. 2

PARTICLE DETECTOR

BACKGROUND OF THE INVENTION

The present invention relates to a detector for monitoring the passing of particles, such as seeds and the like, through a conduit, for the purpose of counting the number of particles passing through the conduit or of monitoring whether or not the particles are passing through the conduit.

In some agricultural apparatus such as mechanized seeders, it is desirable to detect whether seeds are transported (either by gravity or air pressure) to the seeder discharge nozzle with appropriate spacing so as to be deposited in a furrow at a desired relative distance and with a predetermined number of seeds dropped in a given area or within a predetermined time. Mechanized seeders are, therefore, often provided with some detection means for indicating whether the seeds are flowing, or whether some obstruction in the seeder pipe or line has interrupted the flow of seeds to the ground.

Seed flow detectors heretofore used in mechanized seeders are of the optical type. They consist generally of a light source disposed on one side of a conduit through which the seeds are caused to flow one by one and of a photo-cell diametrically disposed relative to the light source, such that the light beam from the light source is interrupted by each seed passing through the condiut, with the photo-cell providing an output signal corresponding to the passage of each seed. It is readily apparent that when operating in a dusty ambient, as is generally the case when seeding a field, and when a certain amount of dust is mixed with the seeds, the efficiency and sensitivity of an optical detector is subject to rapid deterioration unless the light source, the lenses and the photo-cell are subjected to frequent dismantling and cleaning operations. In addition, as each seed must obturate the light beam in order to be detected, such devices cannot be readily made to operate with seeds of different diameters. In other words, when large seeds, such as corn seeds, for example, are used, a conduit of relatively large diameter can be used as long as the seed is caused to be translated substantially along the axis of the conduit, such as to cause a sharp signal at the photo-cell as a result of the seed interrupting all or most of the light beam. However, when smaller seeds are being planted, for example of the order of 3 or 4mm in diameter, it is necessary to replace the relatively large diameter conduit with a small diameter conduit in order to provide a complete occultation of the light beam for obtaining a correct and discrete signal at the output of the photo-cell.

The inconveniences of such conventional optical detectors are readily apparent. A variety of adaptors of different sizes, each conforming to a narrow seed size range, must be used interchangeably, and the use of relatively small throat conduits is often the cause of jamming, such that the detector becomes the cause of the problems it is intended to detect.

Such inconveniences and disadvantages are eliminated by the present invention which provides a particle flow detector capable of accurately detecting and monitoring the flow of particles, such as seeds, through a conduit, irrespective of the size of the particles, by means of a single detector of universal use without adaptors.

SUMMARY OF THE INVENTION

The present invention accomplishes its objects by providing an unobstructive detector for the flow of particles, such as seeds, in a conduit by causing each particle to impact upon a hard resounding wall section of the conduit disposed at an angle relative to the trajectory of the particles, between shock absorbing portions of the conduit, each impact being detected by means of an appropriate transducer disposed at, or proximate to, the area of impact of the particles.

The diverse objects and advantages of the present invention will become apparent to those skilled in the art when the following description of the best mode contemplated for practicing the invention is read in conjunction with the accompanying drawing wherein like references relate to like parts, and in which:

BRIEF DESCRIPTION OF THE DRAWING

FIG. 1 is a schematic sectional view of a particle detector according to the present invention; and FIG. 2 is a schematic diagram of a monitoring device utilizing the particle detector of the present invention.

DETAILED DESCRIPTION OF THE PREFERRED EMBODIMENT

Referring now to FIG. 1, a particle detector 10 according to the present invention comprises a first tubular conduit 11 made of a substantially shock absorbing material, such as rubber or a rubber-like plastic, in which particles such as seeds 12 are caused to flow substantially axially. The tubular conduit 11 has an outlet connected to the inlet of an angled-over tubular conduit section 14 made of a substantially rigid, hard and resounding material, such as thin-walled stainless steel, aluminum or, preferably, high-impact styrene. By "angled-over" conduit is meant a tubular conduit 14 forming a bend at an appropriate angle $a$ relative to the axis 16 of the inlet conduit 11, such that the particles or seeds 12 are caused to impact, as shown at 18, on an area of the inner surface of the wall of the conduit 14. Each seed 12 impacting on the inner surface of the wall of the conduit 14 is deflected, as shown at 20, under a relatively shallow angle. The angled-over conduit 14 has an outlet connected to the inlet of a third tubular conduit 22 made of an impact absorbing material similar to the material used for making the first tubular conduit 11. The common axis 23 of the outlet of the angled-over conduit 22 and of the outlet of the conduit 14 and the axis 16 of the inlet conduit 11 are preferably substantially parallel, and the distance L separating the inlet axis 16 and outlet axis 23 is preferably equal or larger than the diameter of the angled-over conduit 14.

Affixed to the outer surface of the wall of the angled-over tubular conduit 14, there is a transducer 24 preferably glued or cemented to the exterior surface of the wall, at or proximate to the area of impact 18 of the seeds 12 upon the inner surface of the wall of the conduit 14. The transducer 24 may take any appropriate form such as a crystal, a strain gauge, a microphone, or the like, and is capable of providing an appropriate output signal into a line 26, each time a particle or seed 12 impacts anywhere upon the wall of the resounding angled-over conduit 14.

The assembly consisting of the inlet tubular conduit 11, the intermediary angled-over tubular conduit 14, the outlet tubular conduit 22, and the transducer 24 is embedded in a shock absorbing enclosure 28, provided with appropriate means such as clamps or brackets for mounting on a suitable support means. When used as part of a mechanized seeder, the particle detector 10 of the invention, consisting of the assembly of FIG. 1 is placed at some convenient location in a vertically disposed conduit from the seed hopper to the seed discharging nozzle, the seeds being dropped through the vertical conduit and flowing therein generally under the influence of gravity or air pressure. In such arrangements, the inlet tubular conduit 11 and the outlet tubular conduit 23 have their axes substantially parallel. In other apparatus in which the particle detector of the invention may be incorporated, the particle detector 10 is connected at some convenient portion of a conduit in which the particles are caused to flow, by compressed air or other means, such as to monitor the flow of particles.

FIG. 2 illustrates a utilization circuit consisting of interconnected electrical and logic elements, each one well-known in the art, providing a complete particle detecting and monitoring device. The transducer 24 has its output, by means of line 26, connected to the input of an amplifier 30 in turn feeding into a hi-pass filter 32. In this manner, the output signal from the transducer 24, representing the impact of a particle against the wall of the angled over tubular conduit 14, after amplification by the amplifier 30 and passage through the hi-pass filter 32 provides a sharp output signal corresponding only to the high frequency component of the impact signal thus eliminating any parasitical ambient noise, such as caused by vibrations and the like, which could give a false signal. Each signal at the output of the filter 32 is applied to the input of a Schmitt trigger 34, providing at its output an appropriate pulse to a counter 36, and in addition, or in the alternative, to an indicator 38. The counter 36 therefore counts every particle, or seed, passing through the conduit, from which can be determined the number of seeds, for example, being planted in a particular surface area. In addition, or in the alternative, the indicator 38, in the form of a visual display or an audio signal, indicates, for example, the lack of flow of particles through the conduit, therefore detecting a jam or an empty particle hopper.

Having thus described the invention by way of an example of structural embodiment, modifications whereof will be apparent to those skilled in the art, what is claimed as novel is as follows:

1. A particle detector comprising a first tubular conduit having an outlet to which said particles are translated one by one, said first tubular conduit being made of a shock absorbing material, a second tubular conduit having an inlet connected to the outlet of said first conduit and an outlet, said second tubular conduit being made of a hard resounding material and being disposed with its longitudinal axis at an angle to the trajectory of said particles for causing said particles to impact upon a wall of said second tubular conduit, a third tubular conduit made of shock absorbing material having an input connected to the output of said second tubular conduit, and an impact transducer affixed to the exterior of the wall of said second tubular conduit proximate to the area of impact of said particles for providing an electrical signal for each impact of a particle on said wall.

2. The particle detector of claim 1 wherein said detector is imbedded in a shock absorbing enclosure.

3. The particle detector of claim 1 wherein said second tubular conduit is made of high impact styrene.

4. The particle detector of claim 1 wherein said transducer is a crystal.

5. The particle detector of claim 1 wherein said transducer is a strain gauge.

6. The particle detector of claim 1 wherein said transducer is a microphone.

7. The particle detector of claim 1 wherein said first and second conduits have substantially parallel longitudinal axes.

8. The particle detector of claim 7 wherein the distance between said axes is at least equal to the diameter of said second tubular conduit.

9. The particle detector of claim 1 wherein said first and second conduits are disposed substantially vertically and said particles are translated by gravity.

10. The particle detector of claim 1 wherein said particles are translated by air pressure.

11. The particle detector of claim 1 further comprising an electrical circuit connected to said transducer, said electrical circuit comprising an indicator of the flow of particles through said conduits.

12. The particle detector of claim 7 wherein said indicator is a counter counting the number of particles flowing through said conduits.

13. The particle detector of claim 7 wherein said electrical circuit comprises an amplifier, a hi-pass filter, a Schmitt trigger and a counter.

* * * * *